US008531570B2

(12) United States Patent  
Sugimura

(10) Patent No.: US 8,531,570 B2  
(45) Date of Patent: Sep. 10, 2013

(54) IMAGE PROCESSING DEVICE, IMAGE PROCESSING METHOD, AND PROGRAM

(75) Inventor: Naozumi Sugimura, Yokohama (JP)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/325,861

(22) Filed: Dec. 14, 2011

(65) Prior Publication Data

US 2012/0154634 A1  Jun. 21, 2012

(30) Foreign Application Priority Data

Dec. 17, 2010 (JP) ................................ 2010-281378

(51) Int. Cl.
H04N 5/335 (2011.01)
(52) U.S. Cl.
USPC .......................................... 348/324; 348/322
(58) Field of Classification Search
USPC ............... 348/231.2, 317, 322, 324, 305, 320
See application file for complete search history.

(56) References Cited

U.S. PATENT DOCUMENTS

| 5,999,226 | A | * | 12/1999 | Choi | 348/564 |
| 2001/0042817 | A1 | * | 11/2001 | Harada | 250/208.1 |
| 2002/0054229 | A1 | * | 5/2002 | Sasaki | 348/312 |
| 2006/0140498 | A1 | * | 6/2006 | Kudo et al. | 382/254 |
| 2009/0282317 | A1 | * | 11/2009 | Lapstun et al. | 714/769 |

FOREIGN PATENT DOCUMENTS

JP 2007243819 9/2007

* cited by examiner

Primary Examiner — Tuan Ho  
Assistant Examiner — Shahbaz Nazrul  
(74) Attorney, Agent, or Firm — The Farrell Law Firm, P.C.

(57) ABSTRACT

An image processing device and method for reducing the line memory consumption in an image processor is disclosed. The image processing device includes an imaging unit for acquiring image data by imaging a subject, an image memory to which a first part out of first and second parts of the image data output from the imaging unit is input, and an image processor for image-processing the first part received from the image memory, image-processing the second part received without passing it through the image memory, and generating a processed image corresponding to the image data by synthesizing the processed first and second parts.

8 Claims, 11 Drawing Sheets

THIRD SWITCHING STATE

IMAGE PROCESSING DEVICE, IMAGE PROCESSING METHOD, AND PROGRAM

PRIORITY

This application claims priority under 35 U.S.C. §119(a) to a Japanese Patent Application filed in Japanese Patent Office on Dec. 17, 2010 and assigned Serial No. 281378/2010, the contents of which are incorporated herein by reference.

BACKGROUND OF THE INVENTION

1. Field of the Invention

The present invention relates to an image processing device, an image processing method, and a program.

2. Description of the Related Art

In the digital camera field, an image processor performs interpolation on the image data received from an imaging device such as Charge Coupled Device (CCD). When the image data has the Bayer structure, the image processor performs color conversion (or development) into Red-Green-Blue (RGB) information. In this process, in order to perform image processing using top/bottom/left/right pixel information, the image processor requires a line memory of a few lines.

However, the recent trend is that the size of the line memory increases due to the high pixelation of the imaging device, and the required number of lines of the line memory also increases due to the advancement of image processing. In the process of manufacturing integrated circuits, however, the increase in size of the line memory causes a cost increase, making it preferable to reduce the size of the line memory.

One method for solving these problems includes recording first the entire image of the image data output from the imaging device in a frame memory provided out of the image processor, vertically splitting the image, inputting the split image to the image processor, and performing image processing thereon multiple times in a divided manner. This method makes it possible to reduce the size of the line memory because the image data is processed in the manner of a small image in the horizontal direction.

However, this method of recording first the entire image in the frame memory before performing image processing requires the entire image to be read out in the frame memory one by one, causing an increase in the number of accesses to the frame memory. As a result, power consumption and processing time undesirably increase.

SUMMARY OF THE INVENTION

An aspect of an embodiment of the present invention is to provide a new and improved image processing device and method capable of reducing the size of a line memory in an image processor while reducing the number of accesses to an external memory in performing image processing on image data.

In accordance with an aspect of the present invention, there is provided an image processing device including an imaging unit for acquiring image data by imaging a subject, an image memory to which a first part out of first and second parts of the image data output from the imaging unit is input, and an image processor for image-processing the first part received from the image memory, image-processing the second part received without passing through the image memory, and generating a processed image corresponding to the image data by synthesizing the processed first and second parts.

In the image processing device, the image processor first records a part (the first part) of the image data output from the imaging unit in the image memory, for image processing, and directly processes the second part without passing it through the image memory, making it possible to omit part of the process of recording the image data in the image memory and reading the first part from the image memory. In other words, the number of accesses to the image memory is reduced. In addition, the image processor splits the image data into first and second parts and processes them separately, which increases memory space. Moreover, only the first part is input to the image memory, further increasing image memory space.

In accordance with another aspect of the present invention, there is provided an image processing method including inputting to an image memory a first part out of first and second parts of image data output from an imaging unit, inputting the second part to an image processor without passing it through the image memory and image-processing the second part, inputting the first part from the image memory to the image processor and image-processing the first part, and generating a processed image corresponding to the image data by synthesizing the processed first and second parts.

In accordance with a further aspect of the present invention, there is provided a non-transitory computer-readable recording medium having recorded thereon a computer program for executing an image processing method, the method comprising inputting to an image memory a first part out of first and second parts of image data output from an imaging unit, inputting the second part to an image processor without passing it through the image memory and image-processing the second part, inputting the first part from the image memory to the image processor and image-processing the first part, and generating a processed image corresponding to the image data by synthesizing the processed first and second parts.

As described above, the present invention reduces the size of line memory in an image processor while reducing the number of accesses to an external memory in performing image processing on image data.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

Structure of Imaging Apparatus

Figure 1:
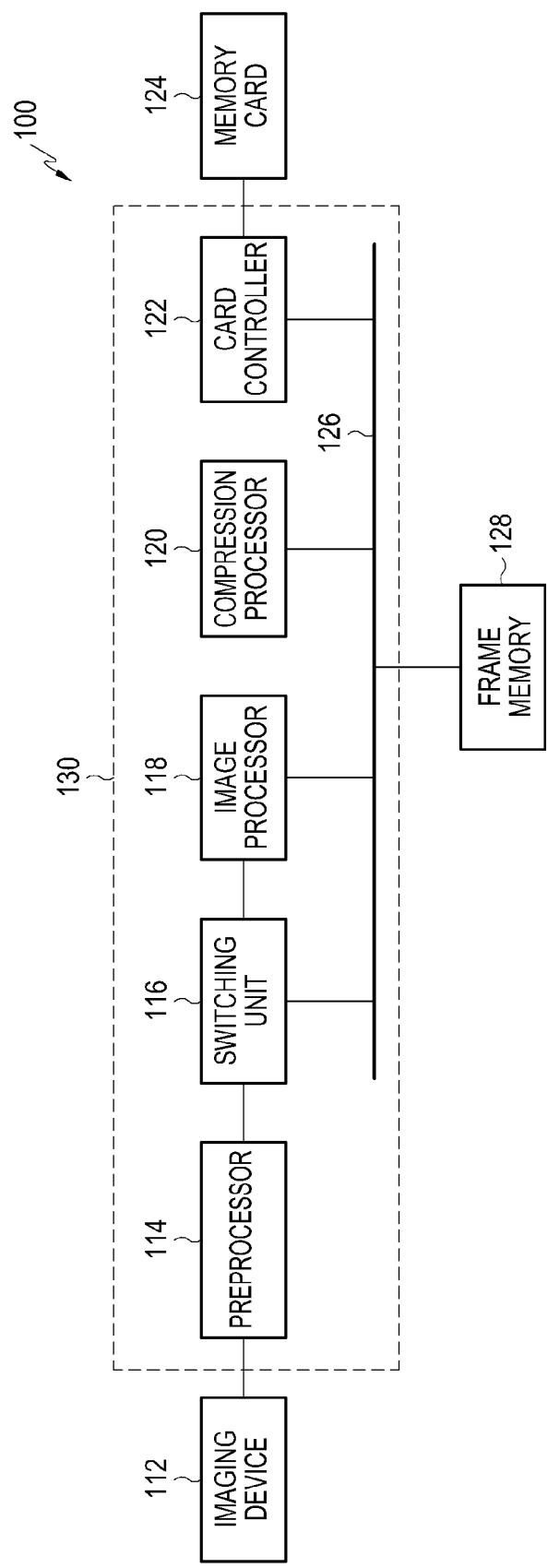
FIG. 1 illustrates a structure of an imaging apparatus 100.

FIG. 1 illustrates a structure of the imaging apparatus 100.

The imaging apparatus 100 is, for example, a digital camera capable of capturing still images, or a video camera capable of shooting video clips. The digital camera may also shoot both the still images and video clips.

The imaging apparatus 100, as illustrated in FIG. 1, includes an imaging device 112 (an example of an imaging unit), a preprocessor 114, a switching unit 116, an image processor 118, a compression processor 120, a card controller 122, a memory card 124, a bus 126, and a frame memory 128 (an example of an image memory).

The imaging device 112, an example of a photoelectric conversion device, includes a plurality of elements capable of photoelectric conversion, each of which converts information about the incident light having passed through a lens into an electrical signal. Each element generates an electrical signal corresponding to the amount of received light. Such sensors as a Charge Coupled Device (CCD) image sensor or a Complementary Metal Oxide Semiconductor (CMOS) image sensor may be applied as the imaging device 112.

The imaging device 112 may further include a Correlated Double Sampling (CDS)/Amplifier (AMP) unit, and an Analog to Digital (A/D) converter. The CDS/AMP unit removes reset noise and AMP nose included in the electrical signal output from the imaging device 112, and amplifies the electrical signal up to an arbitrary level. The A/D converter generates a digital signal by digital-converting the electrical signal output from the CDS/AMP unit. The A/D converter outputs the generated digital signal (or image data) to the preprocessor 114, which processes the digital signal output from the A/D converter, and generates an image signal that can undergo image processing. The preprocessor 114 performs processes such as pixel defect correction, black level correction and shading correction for the imaging device 112. The preprocessor 114 outputs the generated image signal (or image data) to the switching unit 116.

The switching unit 116 switches to the frame memory 128 an input of a first part A1 (see FIG. 2) out of first and second parts A1 and A2 of the image data (or line data) output from the preprocessor 114, and switches an input of the second part A2 to the image processor 118. The switching unit 116 will be described in detail below.

The frame memory 128, for example, a Synchronous Dynamic Random Access Memory (SDRAM), temporarily preserves the first part A1 which is received through the bus 126 by means of the switching unit 116. The temporarily preserved first part A1 is input to the image processor 118 via the bus 126 at a later time. The frame memory 128 stores the image data and the common data, such as program data.

The image processor 118 receives the first part A1 of the image data, which is received from the frame memory 128, and the second part A2, which is received without passing through the frame memory 128, and converts the first and second parts A1, A2 into a luminance signal and an RGB color signal. Specifically, the image processor 118 image-processes the first part A1 after image-processing the second part A2, and generates a processed image (or image signal) corresponding to the image data by synthesizing the processed first and second parts A1 and A2. The image processor 118 generates the image signal, which has been image-processed based on values such as a White Balance (WB) control value, a γ value, and an edge (contour) enhancement control value. The image processor 118 sends the generated image signal to the compression processor 120.

The compression processor 120 compresses the image, which has undergone intensity gain correction and WB adjustment in the image processor 116, into image data in an appropriate format. The compression processor 120 performs compression-coding processing with a coding scheme for still images, such as the Joint Photographic Experts Group (JPEG) standard.

The card controller 122 stores the compressed image data in the memory card 124 or a recording media. The memory card 124 may be replaced by other recording media such as optical discs (Compact Disc (CD), Digital Versatile Disc (DVD), and Blu-Ray disc), and optical magnetic discs.

Flow of Image-Processing Image Data Output from Imaging Device 112

Figure 2:
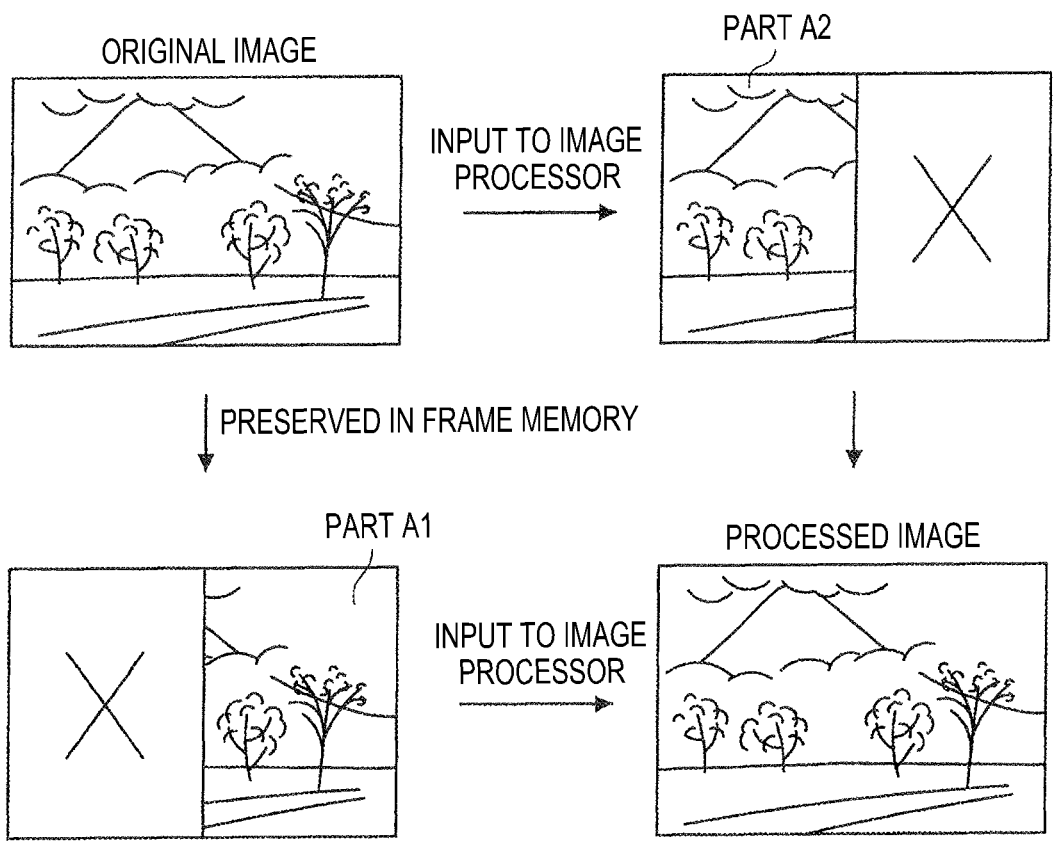
FIG. 2 illustrates a schematic flow of image-processing image data output from an imaging device 112.
Figure 3:
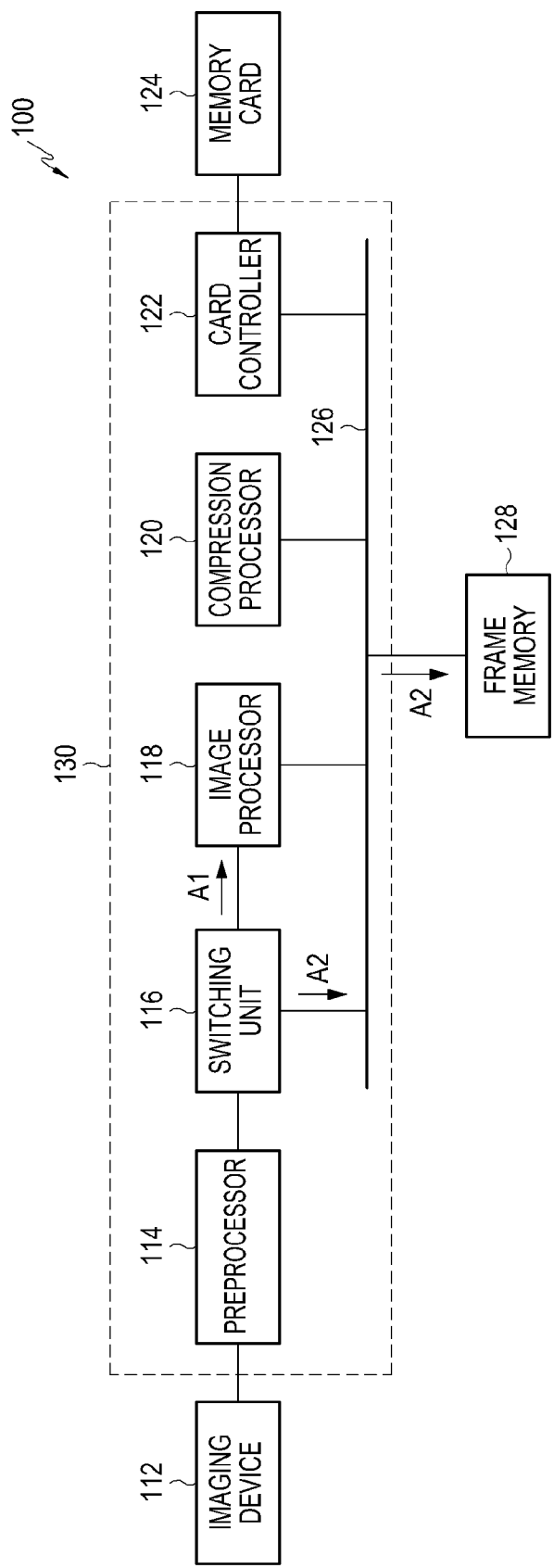
FIG. 3 illustrates input paths of first and second parts A1 and A2 of image data.

FIG. 2 illustrates a schematic flow of image-processing the image data output from the imaging device 112. FIG. 3 illustrates input paths of first and second parts A1 and A2 of the image data.

As shown in FIG. 2, the imaging apparatus 100 inputs the second part A2 corresponding to a half (or left half) of the original image to the image processor 118 without passing it through the frame memory 128, rather than recording the entire image data (or original image) output from the imaging device 112 in the frame memory 128 and then inputting the second part A2 to the image processor 118. On the other hand, the imaging apparatus 100 inputs the first part A1 corresponding to the remaining half (or right half) of the original image to the frame memory 128. Inputs of the first and second parts A1 and A2 may be switched by the switching unit 116 as shown in FIG. 3.

The first part A1, which has been input to the frame memory 128 and temporarily preserved therein, is input to the image processor 118, after the image processor 118 has image-processed the input second part A2. The image processor 118 generates a processed image corresponding to the original image output from the imaging device 112, by image-processing the input second part A2 and then synthesizing the processed first and second parts A1 and A2.

This image processing method of the present invention splits the original image output from the imaging device 112 into first and second parts A1 and A2, for image processing, so that image processing is performed with a smaller line memory compared with when the entire original image is input to the image processor 118. In addition, since the first part A1 of the original image is input to the frame memory 128, the size of the line direction of the frame memory 128 is reduced.

Figure 4:
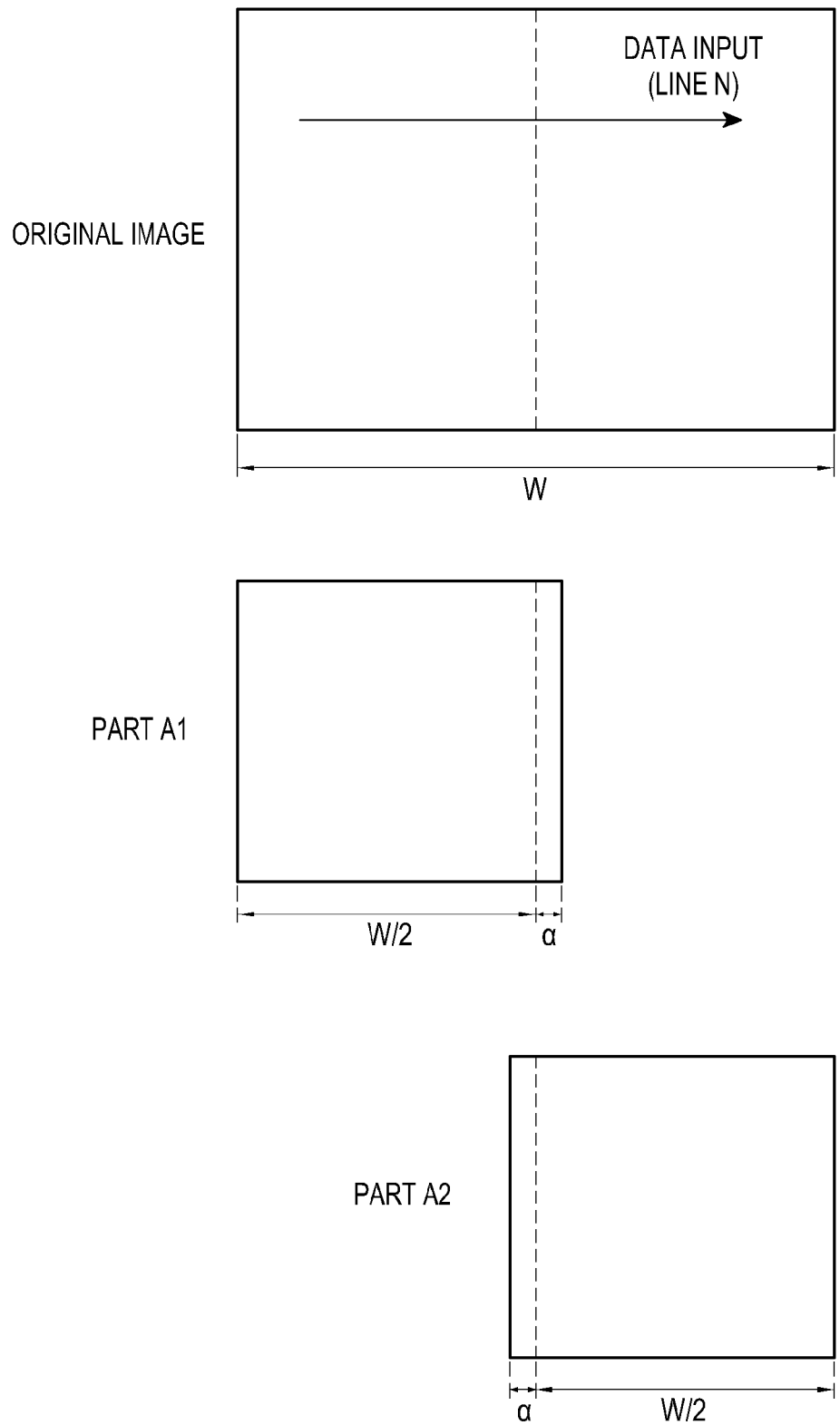
FIG. 4 illustrates split first and second parts A1 and A2 of image data.

FIG. 4 illustrates split first and second parts A1 and A2 of image data. The image data includes line data for multiple lines each having first and second parts A1 and A2, which are divided in the same locations in the line direction. In addition, the first and second parts A1 and A2 of the image data have an overlapping part (α pixel) in which leading and subsequent pixels in the same location are included in the line direction.

Assuming that the width of the original image in the line direction is W, the width of the first part A1 in the line direction is the leading (W/2+α) pixel in the line direction and the width of the second part A2 in the line direction is the subsequent (W/2+α) pixel in the line direction.

The reason why the overlapping part is included in the first and second parts A1 and A2 is that since information about the pixels around the target pixel to be processed is required in the process of performing image processing, the leading W/2 pixel and the subsequent W/2 pixel may properly undergo image processing with use of the overlapping part. Although it is assumed that the first and second parts A1 and A2 include the overlapping part, they may not include the overlapping part.

As described above, in the disclosed imaging apparatus 100, the image processor 118 first records the first part A1 corresponding to a part of the image data output from the imaging device 112 in the frame memory 128, for image processing, and directly processes the second part A2 without passing it through the frame memory 128, making it possible to omit a part of the process of recording the image data in the frame memory 128 and reading the first part A1 from the frame memory 128. In other words, the number of accesses to the frame memory 128 is reduced. In addition, the image processor 118 splits the image data into first and second parts A1 and A2 and processes them separately, which reduces the size of the line memory. Moreover, only the first part A1 is input to the frame memory 128, which further reduces the size of the frame memory 128.

Detailed Structure of Switching Unit 116

Figure 5A:
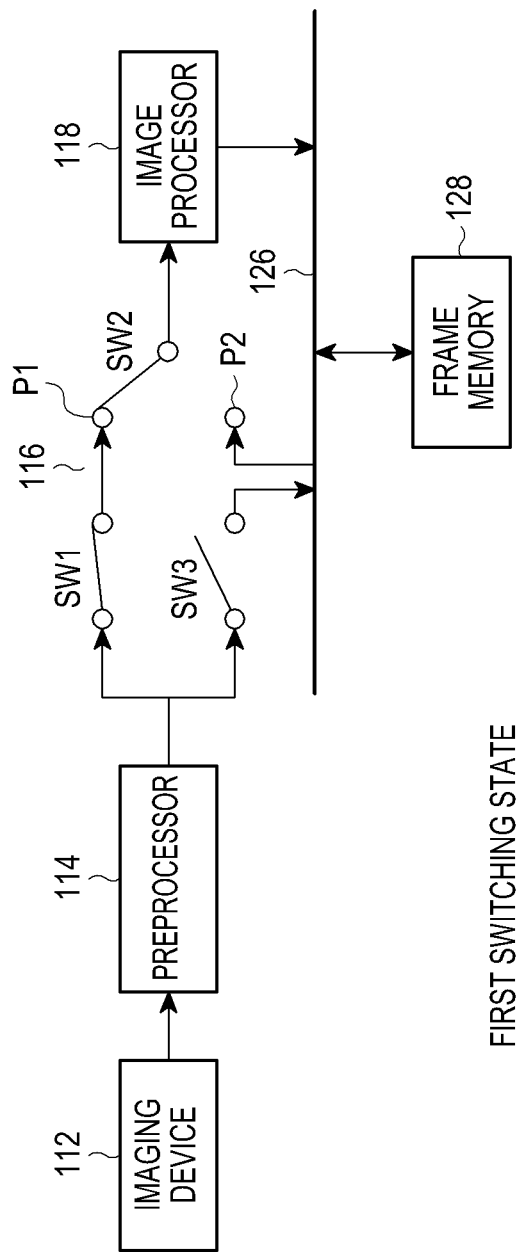
FIG. 5A illustrates a first switching state of a switching unit 116.
Figure 5B:
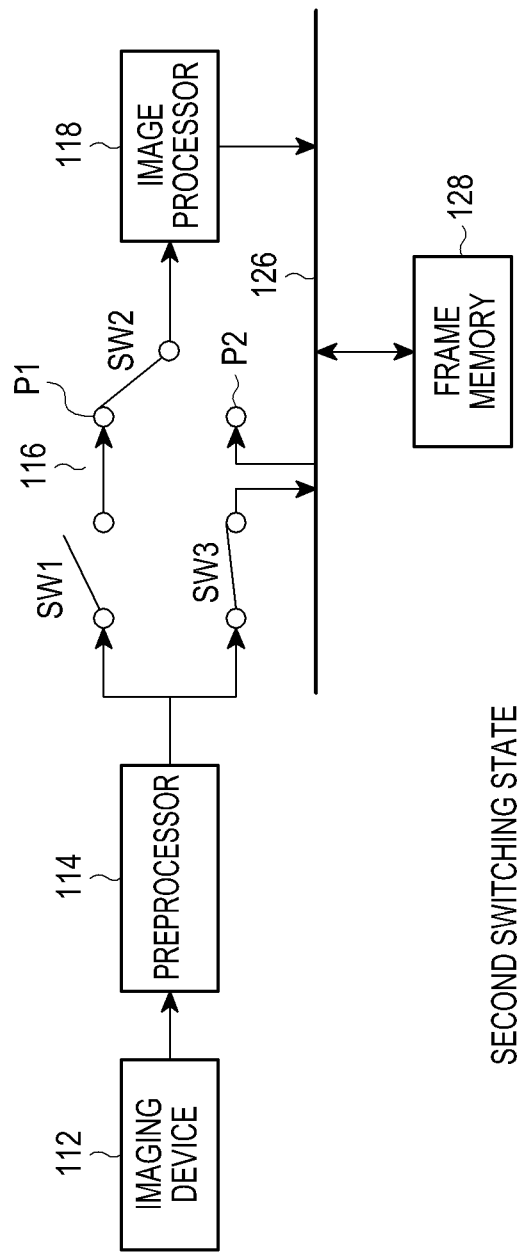
FIG. 5B illustrates a second switching state of the switching unit 116.
Figure 5C:
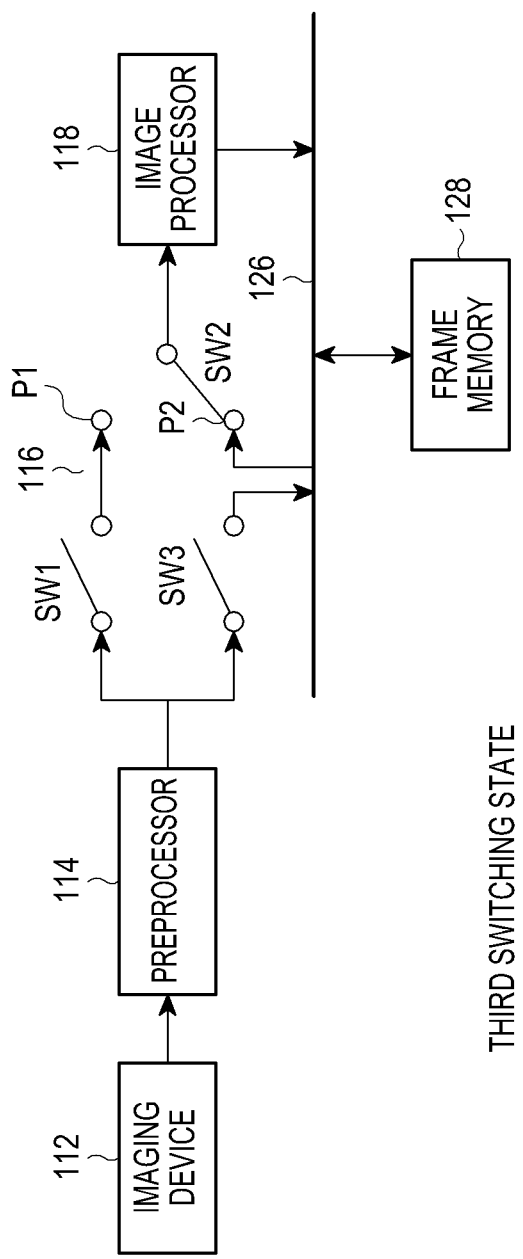
FIG. 5C illustrates a third switching state of the switching unit 116.

FIG. 5A illustrates a first switching state of the switching unit 116. FIG. 5B illustrates a second switching state of the switching unit 116. FIG. 5C illustrates a third switching state of the switching unit 116.

The switching unit 116, as shown in FIGS. 5A to 5C, has three switches SW1, SW2 and SW3. By controlling ON/OFF of the three switches SW1, SW2 and SW3, the switching unit 116 switches an input of the second part A2 of the image data to the image processor 118, an input of the first part A1 to the frame memory 128, and an input of the first part A1 from the frame memory 128 to the image processor 118.

The switching state of the switching unit 116 may be classified into a first switching state in which the switching unit 116 inputs the second part A2 of the image data to the image processor 118, a second switching state in which the switching unit 116 inputs the first part A1 to the frame memory 128, and a third switching state in which the switching unit 116 inputs the first part A1 from the frame memory 128 to the image processor 118. These switching states will be described below.

In the first switching state of the switching unit 116, as shown in FIG. 5A, the switch SW1 is turned ON, switch SW2 is turned ON by being in contact with point P1, and switch SW3 is turned OFF. In this case, the data, which is output from the preprocessor 114 and then input to the image processor 118, will not be input to the frame memory 128. Therefore, as the switching unit 116 maintains the first switching state when the second part A2 of the image data is output from the preprocessor 114, the second part A2 is input to the image processor 118.

In the second switching state of the switching unit 116, as shown in FIG. 5B, switch SW1 is turned OFF, switch SW2 is turned ON by being in contact with point P1, and switch SW3 is turned ON. In other words, compared with in the first switching state, in the second switching state, the ON/OFF states of switches SW1 and SW3 are reversed. In this case, the data, which is output from the preprocessor 114 and then input to the frame memory 128 via the bus 126, will not be input to the image processor 118. Therefore, as the switching unit 116 maintains the second switching state when the first part A1 of the image data is output from the preprocessor 114, the first part A1 is input to the frame memory 128.

The image data of the preprocessor 114 is output on a line data basis. Since each piece of line data has first and second parts A1 and A2, the switching unit 116 switches between the first and switching states on a line data basis. Thus, the first part A1 of each piece of line data is input to the frame memory 128, and the second part A2 is input to the image processor 118.

Figure 6:
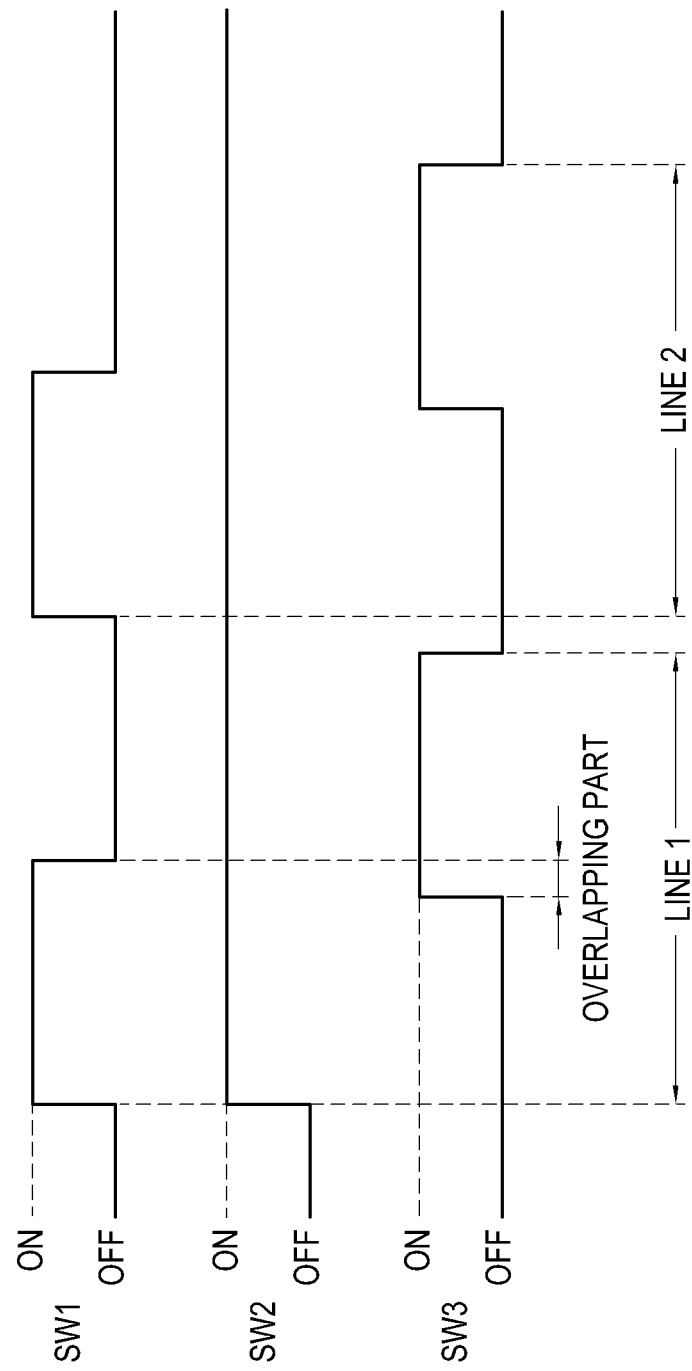
FIG. 6 illustrates switching timings of switches SW1, SW2 and SW3.

FIG. 6 illustrates switching timings of switches SW1, SW2 and SW3. Although the switching states of switches SW1, SW2 and SW3 during output of the first line data (line 1) and the second line data (line 2) are shown in FIG. 6 for purposes of convenience, the switching states are the same even for other pieces of line data. When each piece of line data is output, switches SW1 and SW3 are alternately switched, with switch SW2 turned ON. In addition, because the first and second parts A1 and A2 include an overlapping part as described above, both of switches SW1 and SW3 are turned ON, when the overlapping part is output.

In the third switching state of the switching unit 116, as shown in FIG. 5C, the switch SW1 is turned OFF, switch SW2 is turned ON by being in contact with point P2, and switch SW3 is turned OFF. In this case, the data preserved in the frame memory 128 is input to the image processor 118 via the bus 126. Therefore, as the switching unit 116 maintains the third switching state when the first part A1 of the image data is output from the preprocessor 114 after the image processing on the second part A2 by the image processor 118 is completed, the first part A1 temporarily preserved in the frame memory 128 is input to the image processor 118. In this embodiment, the first part A1 of each piece of line data, which is input to the frame memory 128, is input to the image processor 118 after being summed. After input of line data for all lines is completed, switch SW2 is turned OFF by being separated from points P1 and P2.

Operation of Imaging Apparatus 100

Figure 7:
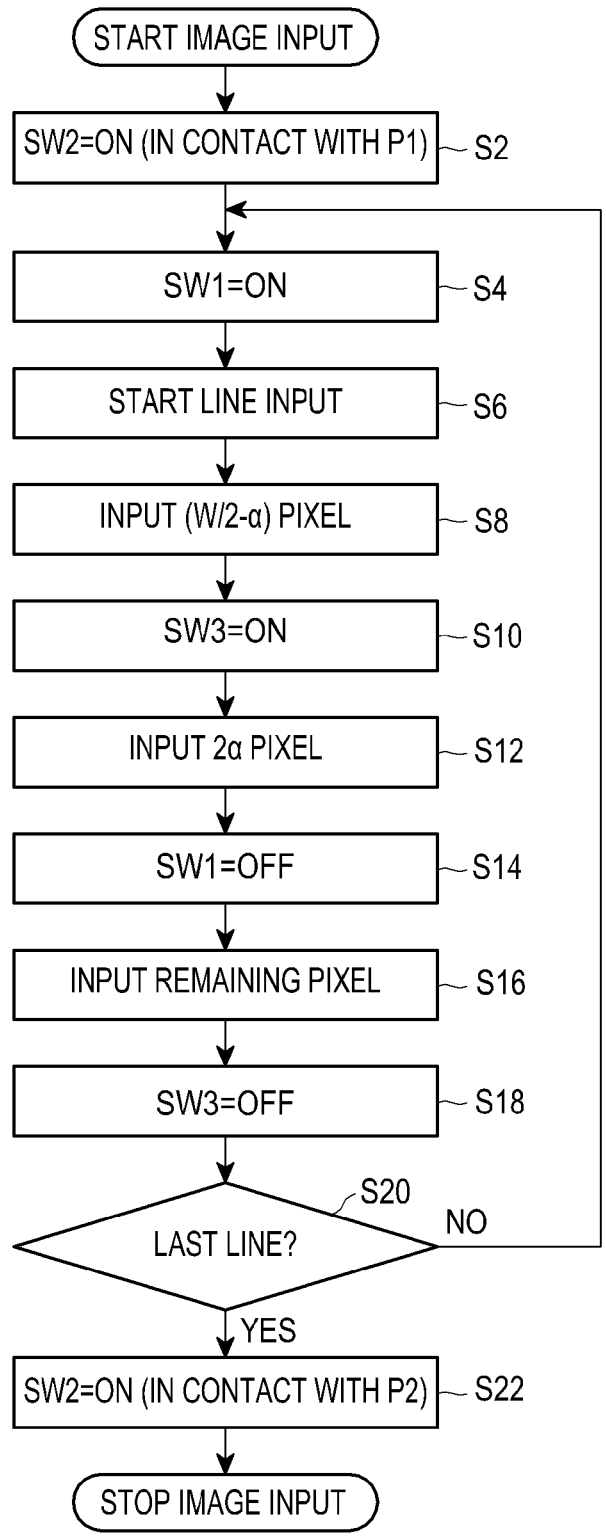
FIG. 7 illustrates an operation of an imaging apparatus 100, performed until image data output from an imaging device 112 is input to an image processor 118.

FIG. 7 illustrates an operation of an imaging apparatus 100, performed until image data output from an imaging device 112 is input to an image processor 118.

This operation is implemented by executing a specific program stored in a memory such as the frame memory 128. The flowchart shown in FIG. 7 starts after image capturing by the imaging device 112 is performed.

The switching unit 116 turns ON the turned-OFF switch SW2 to be in contact with point P1 (step S2). Next, the switching unit 116 turns ON the switch SW1 (step S4). Thus, as shown in FIG. 5A, the data output from the preprocessor 114 may be input to the image processor 118. The imaging apparatus 100 starts line input of the image data from the imaging device 112 (step S6).

First, output of the line data for the first line from the imaging device 112 is started. Then, data of the leading pixel of the line data is input to the image processor 118. If (W/2−α) pixel data in the line data for the first line is input to the image processor 118 (step S8), the switching unit 116 turns ON the switch SW3 (step S10).

Since switches SW1 and SW3 are both turned ON, the subsequent pixel data is input to both the image processor 118 and the frame memory 128. If 2α-pixel data is input to the image processor 118 and the frame memory 128 (step S12), the switching unit 116 turns OFF switch SW1 (step S14).

Because switch SW3 is turned ON as shown in FIG. 5B, the remaining pixel data in the line data for the first line is input to the frame memory 128 (step S16). If the remaining (W/2−α) pixel data is completely input, the switching unit 116 turns OFF the switch SW3 (step S18).

Thereafter, the imaging apparatus 100 repeats the above process (steps S4 to S18) until input of line data for all lines is completed (YES in step S20). Thus, the leading (W/2+α) pixel data of each line data is input to the image processor 118, and the subsequent (W/2+α) pixel data of each line data is input to the frame memory 128.

When the above process (steps S4 to S18) is performed on all pieces of line data, the leading (W/2+α) pixel data having been input to the image processor 118 undergoes image processing by the image processor 118. By first processing the leading (W/2+α) pixel data in this manner, the image processing time is reduced.

If input of all pieces of the line data is completed and image processing on the leading (W/2+α) pixel data is completed, the switching unit 116 turns ON the switch SW2 to be in contact with the point P2 as shown in FIG. 5C (step S22). Then, the subsequent (W/2+α) pixel data of each line data, which has been temporarily preserved in the frame memory 128, is input to the image processor 118. In this manner, input of the image data output from the imaging device 112 to the imaging processor 118 is completed.

The subsequent (W/2+α) pixel data (or second part A2) of each piece of line data, which is input to the image processor 118, is synthesized with the leading (W/2+α) pixel data (or first part A1) having already been completely processed, after having undergone image processing by the image processor 118. Specifically, the image processor 118 extracts the leading (W/2) pixel data in the line direction from the processed second part A2, extracts the subsequent (W/2) pixel data in the line direction from the processed first part A1, and synthesizes the leading and subsequent pixel data. By doing so, the image processor 118 generates a processed image corresponding to the image data output from the imaging device 112.

Effectiveness of Imaging Apparatus 100

Figure 8:
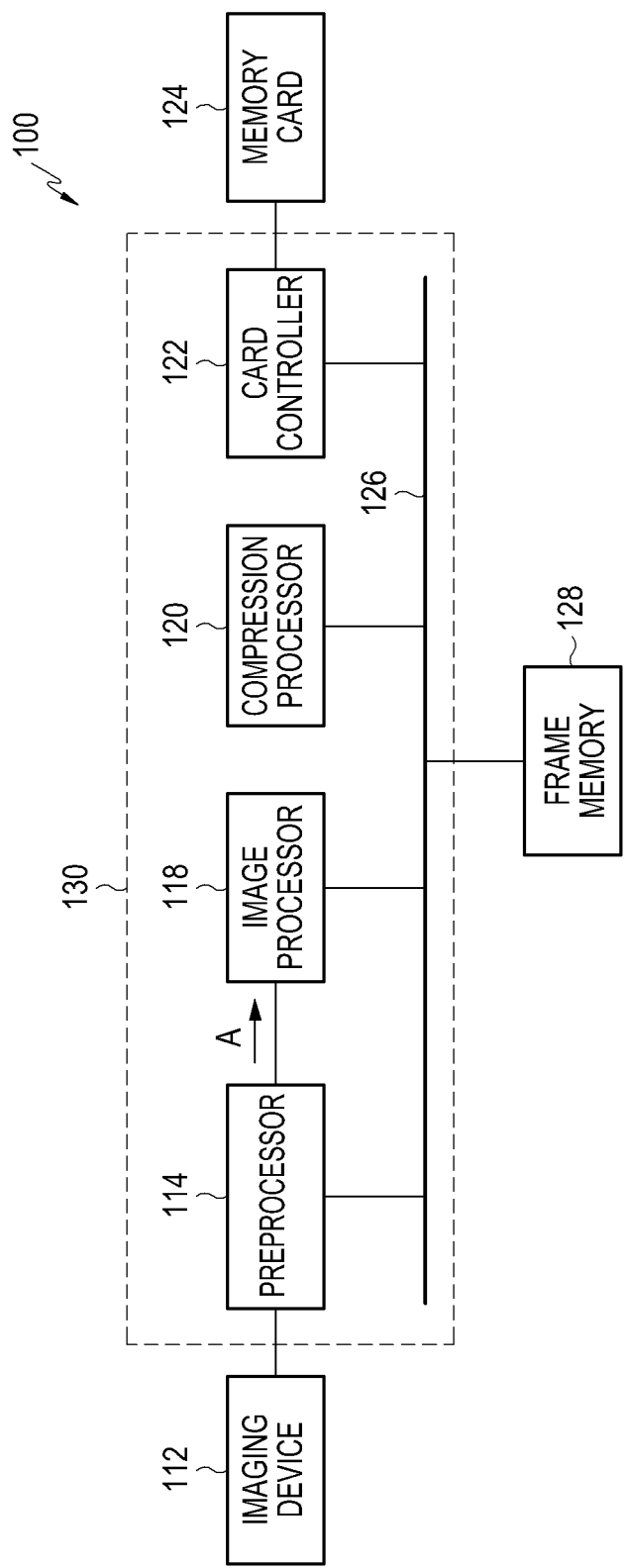
FIG. 8 illustrates a first comparative example.
Figure 9:
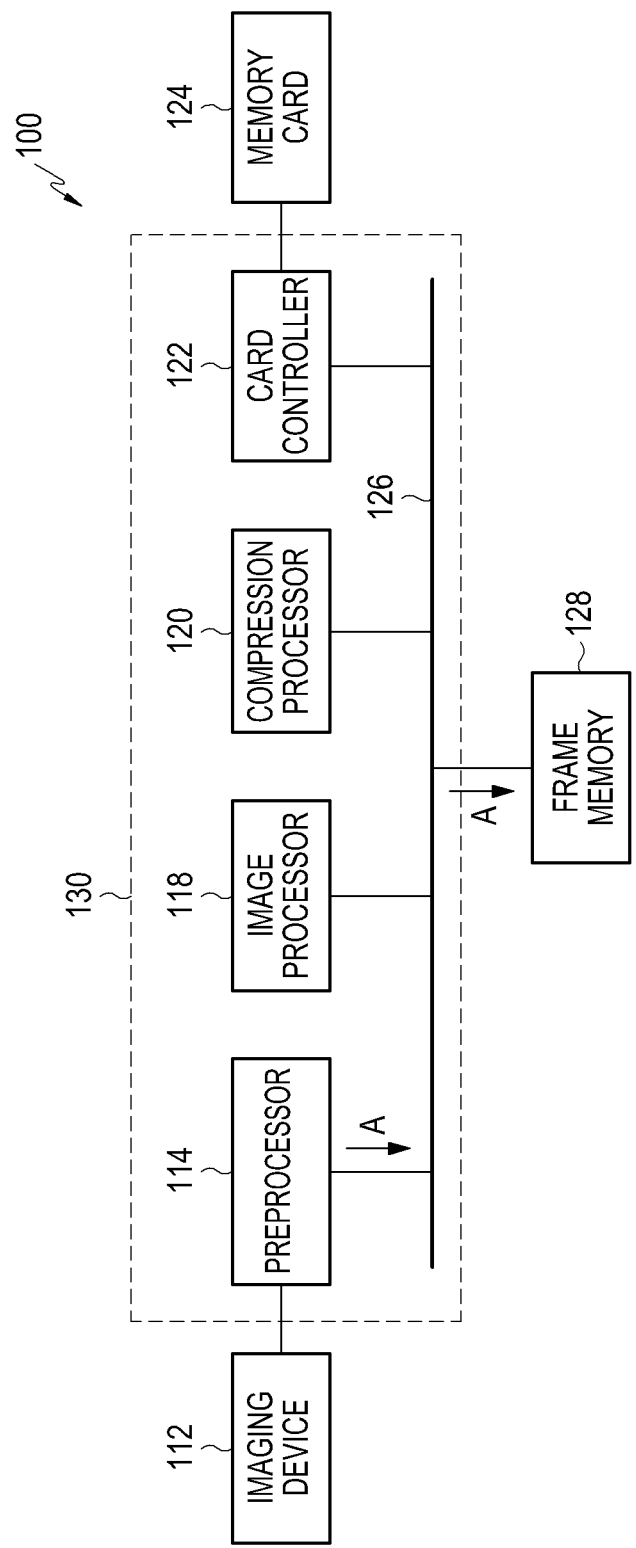
FIG. 9 illustrates a second comparative example.

FIG. 8 illustrates a first comparative example, and FIG. 9 illustrates a second comparative example.

First, in the disclosed imaging apparatus 100, the image processor 118 records a part (first part A1) of the image data output from the imaging device 112 in the frame memory 128, for image processing, and directly processes a second part A2 without passing it through the frame memory 128. As a result, the image processor 118 omits a part of the process of recording the image data in the frame memory 128 and reading the first part A1 from the frame memory 128. In other words, the number of accesses to the frame memory 128 is reduced. In addition, the image processor 118 splits the image data into first and second parts A1 and A2 and processes the first and second parts A1 and A2 separately, which reduces the line memory consumption in the image processor 118. Moreover, only the first part A1 is input to the frame memory 128, which reduces consumption of the frame memory 128.

The first comparative example shown in FIG. 8 will now be described. In the first comparative example, the image data A, which is output from the imaging device 112 and processed in the preprocessor 114, is all input to the image processor 118 without being input to the frame memory 128. Therefore, the image processor 118 processes the entire image data (or line data) output from the preprocessor 114 at one time, causing an increase in the line memory consumption.

The second comparative example shown in FIG. 9 will now be described. In the second comparative example, the image data A, which is output from the imaging device 112 and then processed in the preprocessor 114, is first recorded in the frame memory 128. Thereafter, the original image from the frame memory 128 is split into multiple sizes, and then input to the frame memory 128. In this case, the number of accesses to the frame memory 128 increases, causing an increase in the power consumption and the processing time.

The imaging apparatus 100 solves the problems of the first and second comparative examples by reducing the line memory consumption in the image processor 118 as well as the number of accesses to the frame memory 128 in performing image processing on the image data.

OTHER EMBODIMENTS

While the invention has been shown and described with reference to certain embodiments thereof, it will be understood by those skilled in the art that various changes in form and details may be made therein without departing from the spirit and scope of the invention as defined by the appended claims and their equivalents.

Although the digital camera is given as an example of the imaging apparatus in the above embodiment, the imaging apparatus may be, for example, a mobile phone, a Personal Digital Assistant (PDA), a game player, an electronic dictionary, and a notebook computer, having an imaging device.

In addition, although a series of processes described in the above embodiment may be performed by dedicated hardware, the series of processes may be performed by software (or application), or a combination thereof. In this case, the series of processes may be implemented by running a program in a general purpose or dedicated computer. This program can be stored in a volatile or nonvolatile recording medium readable by a machine such as a computer. This medium can be a storage device such as a Read-Only Memory (ROM), a memory such as a Random-Access Memory (RAM), a memory chip, or an integrated circuit, or an optical or magnetic recording medium such as a Compact Disc (CD), a Digital Versatile Disc (DVD), a magnetic disk, or a magnetic tape.

The steps shown in the flowchart of FIG. 7 include not only the processing that takes place in time series in the listed order, but also the processing that is executed in parallel or individually, though it does not take place in time series. Furthermore, even the order of the steps, which are processed in time series, may be properly changed in some cases.

What is claimed is:

1. An image processing device comprising:
   an imaging unit for acquiring image data of a subject, wherein the image data comprises a plurality of pieces of line data;
   a preprocessor that receives the image data from imaging unit and outputs a first part of the image data and a second part of the image data on a line data basis, wherein the first part of the image data is divided from the second part of the image data at a location in a line direction;
   an image memory to which the first part of the image data is input; and
   an image processor for image-processing the first part of the image data received from the image memory, image-processing the second part of the image data received without passing through the image memory, and generating a processed image corresponding to the image data by synthesizing the processed first and second parts of the image data.

2. The image processing device of claim 1, further comprising a switching unit for switching an input of the first part to the image memory and an input of the second part to the image processor.

3. The image processing device of claim 2, wherein the switching unit selectively switches an input of the first part to the image memory and an input of the second part to the image processor on the line data basis.

4. The image processing device of claim 3, wherein the first and second parts have an overlapping part in which leading and subsequent pixels in the same location are included in the line direction.

5. The image processing device of claim 3, wherein the first part of each piece of line data, which is input to the image memory, is input to the image processor after being summed.

6. The image processing device of claim 1, wherein the first part is input from the image memory to the image processor after the second part is processed by the image processor.

7. An image processing method comprising:
   acquiring image data of a subject at an imaging unit, wherein the image data comprises a plurality of pieces of line data;
   receiving the image data at a preprocessor, and outputting a first part of the image data and a second part of the image data on a line data basis, wherein the first part of image data is divided from the second part of image data at a location in a line direction;
   inputting to an image memory the first part of the image data;
   inputting the second part of the image data to an image processor without passing through the image memory and image-processing the second part;
   inputting the first part of the image data from the image memory to the image processor and image-processing the first part; and
   generating a processed image corresponding to the image data by synthesizing the processed first and second parts of the image data.

8. A non-transitory computer-readable recording medium having recorded thereon a computer program for executing an image processing method, the method comprising:
   acquiring image data of a subject at an imaging unit, wherein the image data comprises a plurality of pieces of line data;
   receiving the image data at a preprocessor, and outputting a first part of the image data and a second part of the image data on a line data basis, wherein the first part of image data is divided from the second part of image data at a location in a line direction;
   inputting to an image memory the first part of the image data;
   inputting the second part of the image data to an image processor without passing through the image memory and image-processing the second part;
   inputting the first part of the image data from the image memory to the image processor and image-processing the first part; and
   generating a processed image corresponding to the image data by synthesizing the processed first and second parts of the image data.

\* \* \* \* \*